United States Patent [19]

Oetiker

[11] Patent Number: 5,282,295
[45] Date of Patent: Feb. 1, 1994

[54] DEFORMABLE EAR FOR CLAMPS

[75] Inventor: Hans Oetiker, Horgen, Switzerland

[73] Assignee: Hans Oetiker AG Maschinen- und Apparatefabrik, Horgen, Switzerland

[21] Appl. No.: 822,488

[22] Filed: Jan. 10, 1992

Related U.S. Application Data

[63] Continuation of Ser. No. 922,408, Oct. 23, 1986, which is a continuation of Ser. No. 622,764, Jun. 20, 1984, abandoned.

[51] Int. Cl.$^5$ .............................................. B65D 63/02
[52] U.S. Cl. ................................ 24/20 R; 24/20 CW; 24/271
[58] Field of Search .............. 24/19, 20 R, 20 CW, 24/20 TT, 23 R, 20 EE, 20 W, 271, 22, 23 W, 252, 257

[56] References Cited

U.S. PATENT DOCUMENTS

| 3,475,793 | 11/1969 | Oetiker | 24/271 X |
| 3,789,463 | 2/1974 | Oetiker | 24/20 CW |
| 3,869,944 | 3/1975 | Oetiker | 24/20 CW X |
| 4,106,799 | 8/1978 | Oetiker | 24/20 R X |
| 4,222,155 | 9/1980 | Oetiker | 24/20 R |
| 4,237,584 | 12/1980 | Oetiker | 24/20 CW X |
| 4,299,012 | 11/1981 | Oetiker | 24/19 |
| 4,315,348 | 2/1982 | Oetiker | 24/20 W |
| 4,622,720 | 11/1986 | Oetiker | 24/20 CW X |
| 4,711,001 | 12/1987 | Oetiker | 24/20 W X |
| 4,991,266 | 2/1991 | Oetiker | 24/20 CW X |

FOREIGN PATENT DOCUMENTS 1065634 4/1967 United Kingdom .......... 24/20 CW

Primary Examiner—Laurie K. Cranmer
Attorney, Agent, or Firm—Paul M. Craig, Jr.

[57] ABSTRACT

A reinforced ear structure for use in a clamp whose clamping band is intended to be contracted by relatively large tightening forces; the ear consists of two outwardly extending leg portions and a reinforced bridging portion interconnecting the leg portions; the bridging portion is provided with a generally pan-shaped, relatively hollow, depressed reinforcement formed by a bottom portion and connecting portions between the bottom portion and the remaining non-depressed bridging portion; the connecting portions thereby extend over substantial parts of the length and width of the bridging portion and the bottom portion is relatively flat.

35 Claims, 1 Drawing Sheet

DEFORMABLE EAR FOR CLAMPS

This application is a continuation application of my copending application Ser. No. 06/922,408, filed on Oct. 23, 1986, and entitled "Deformable Ear For Clamps," which was a continuation application of my then copending application Ser. No. 622,764, filed on Jun. 20, 1984 now abandoned and entitled "Deformable Ear for Clamps."

The present invention relates to a deformable ear structure for clamps whose clamping band is intended to be contracted by relatively large tightening forces.

Deformable ears for clamp structures which consist of two outwardly extending leg portions interconnected by a bridging portion, which are generally known as "Oetiker" ears, have been sold worldwide in large quantities and enjoyed immense commercial success. These ears are used in endless one-ear or two-ear clamps, for example, as disclosed in U.S. Pat. Nos. 2,614,304 and 3,082,498, as also in open clamps adapted to be interconnected and as disclosed, for example, in U.S. Pat. Nos. 2,847,742, 3,082,498 and 3,475,793. These "Oetiker" ears not only assure good holding properties, but are able to compensate for thermal expansions and pressure changes to which the clamps are subjected, due to their inherent elasticity even after permanent deformation thereof. To avoid buckling of the ear during deformation when using relatively thin band material, and to increase the holding ability in the deformed condition, reinforcing grooves, as disclosed in my prior U.S. Pat. No. 3,402,436 which extend in the circumferential direction of the clamp, have been used in large quantities with "Oetiker" ears during more than one decade. The reinforcing grooves as used heretofore in the bridging portion consisted of a small groove, normally in the central part of the bridging portion, which extended in the circumferential direction of the clamp. These prior art reinforcing grooves were of more or less V-shaped configuration as viewed in transverse cross section through the bridging portion in a plane containing the axis of the clamp structure. As viewed from above, these reinforcing grooves were more or less in the shape of a canoe or small row boat. While these prior art reinforcing grooves proved extraordinarily successful, the development of new plastic materials of ever-increasing hardness, such as "HYTRELL", require ever-increasing clamping forces to assure complete tightness.

Leakages due to internal offsets or steps in the clamp structure, can be effectively precluded by the so-called stepless clamp structure as disclosed in my prior U.S. Pat. No. 4,315,348. The holding ability of an open clamp structure utilizing an "Oetiker" ear was also considerably improved by the mechanical connection as disclosed in my prior U.S. Pat. No. 4,299,012. However, to increase the holding ability of the clamp, higher closing or tightening forces are required. This, in turn, requires an ear structure capable of accommodating the higher closing or tightening forces which, in turn, suggests the possible use of clamping bands with properties permitting higher closing- or tightening forces such as different tensile strength, different materials and/or thicker bands.

Accordingly, it is a principal object of the present invention to provide an ear structure for clamps, which allows the clamps to be contracted with relatively high tightening or closing forces.

Another object of the present invention resides in an ear structure for clamps which permits the use of band material having relatively high tensile strength.

A further object of the present invention resides in an ear structure for clamps which permits the attainment of relatively high tightening or closing forces without jeopardizing the ability of the clamp to provide compensation for temperature and/or pressure fluctuations.

The underlying problems are solved according to the present invention in that the bridging portion is provided with a reinforcing means of generally pan-shaped, relatively shallow configuration with a length and width corresponding to at least a substantial part of the length and width of the bridging portion. In a preferred embodiment of the present invention, the pan-shaped reinforcement is in the form of a depression having a generally flat bottom and connecting portions connecting the bottom with the remaining non-depressed bridging portion, whereby the connecting portions form an angle with respect to the bottom and the remaining non-depressed bridging portion that approaches a right angle. This angle preferably does not differ substantially from a right angle by more than 20°. The area of the bottom is at least 35 percent of the area of the bridging portion in its non-reinforced condition and preferably occupies about 40 to about 60% of the latter. Additionally, the connecting portions pass over into the bottom and into the remaining non-depressed bridging portion by way of rounded-off corners having relatively small radii of curvature.

These and other objects, features and advantages of the present invention will become more apparent from the following description when taken in connection with the accompanying drawing which shows, for purposes of illustration only, one embodiment in accordance with the present invention, and wherein.

Figure 1:
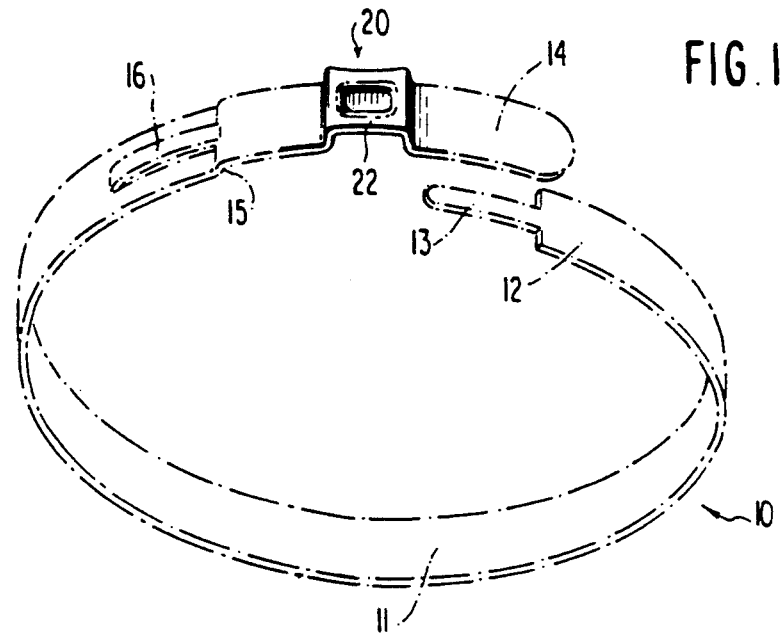
FIG. 1 is a perspective view showing an ear structure in accordance with the present invention as used with an open clamp.

Referring now to the drawing, wherein like reference numerals are used throughout the various views to designate like parts, and more particularly to FIG. 1, which illustrates a clamp structure generally designated by reference numeral 10 that may be, for example, of the type disclosed in my prior U.S. Pat. No. 4,315,348. However, it is understood that the ear structure of the present invention is usable with any other type of clamp, such as, endless clamps made from tubular material, clamps made of several assembled parts, and the like. The clamp structure 10 illustrated in FIG. 1 includes a clamping band 11 having an inner band end portion 12 terminating in a tongue 13 and an outer band end portion 14 provided with a step 15 and a pressed-out recess 16 to form a channel-like recess accommodating the tongue 13 so as to provide the stepless feature as disclosed in my prior U.S. Pat. No. 4,315,348.

Figure 2:
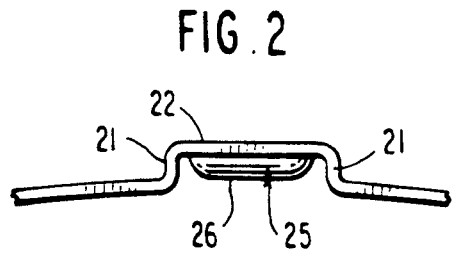
FIG. 2 is a side elevational view, in the axial direction, of the ear structure in accordance with the present invention.

An ear structure 20 in accordance with the present invention is located intermediate the step 15 and the free end of the outer band portion 14. The ear structure 20 consists, as typical of so-called "Oetiker" ears, of two generally outwardly extending leg portions 21 interconnected by a bridging portion 22. The bridging portion 22 is provided with a reinforcement generally designated by reference numeral 25 which is in the shape of a relatively shallow, generally pan-shaped depression including a bottom part 26 as well as longitudinal and transverse connecting portions 27 and 28 connecting the bottom part 26 with the remaining non-depressed bridging portion 22. As can be seen from FIGS. 2, 5 and 6, the bottom part 26 is relatively flat over at least a substantial part of its length and width. However, if so desired, the bottom part may also have a slight curvature, particularly a concave curvature with relatively large radius of curvature.

Figure 5:
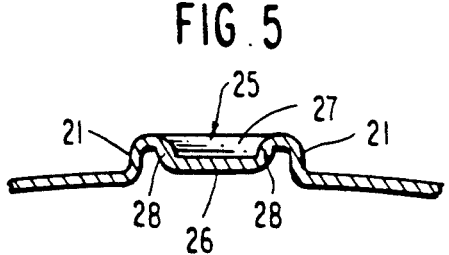
FIG. 5 is a cross-sectional view taken along line 5—5 of FIG. 3.
Figure 6:
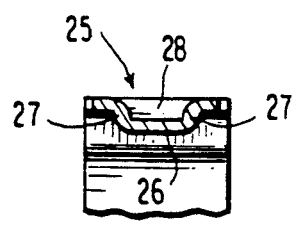
FIG. 6 is a cross-sectional view, taken along line 6—6 of FIG. 3.

As shown in particular in FIGS. 5 and 6, the longitudinal connecting portions 27 and the transverse connecting portions 28 extend at an angle of nearly 90° with respect to the bottom part 26 and the remaining non-depressed bridging portion 22. In a preferred embodiment, this angle differs from a 90° angle by no more than about 20°. The connecting portions 27 and 28 pass over into the bottom part 26 and into the remaining non-depressed bridging portion 22 by way of rounded-off corners of relatively small radii of curvature. These radii of curvature may be the same or may differ from one another and also need not be radii of curvature of constant length in a given corner.

The area occupied by the bottom part should be at least 35% of the area occupied by the non-reinforced bridging portion and preferably occupies between about 40% to about 60% thereof.

Figure 3:
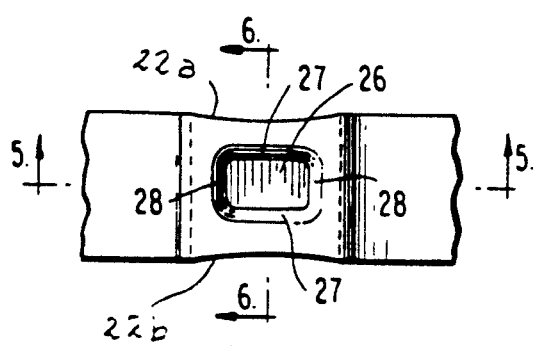
FIG. 3 is a top plan view on the ear structure in accordance with the present invention.
Figure 4:
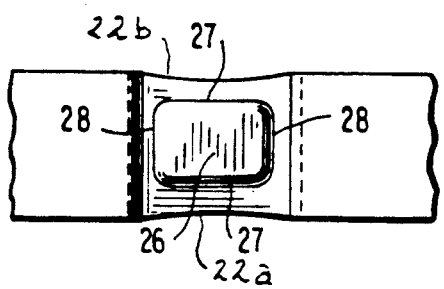
FIG. 4 is a bottom plan view on the ear structure in accordance with the present invention.

Additionally, the sides 22a and 22b of the bridging portion, which extend in the circumferential direction of the clamp 10, are curved slightly concavely, as can be seen in FIG. 1 and in particular in FIGS. 3 and 4, so that the width x of the bridging portion 22, as viewed in a direction transverse to the circumferential direction, is greater in the area near the leg portions 21 than the width y in the central area of the bridging portion 22 located between the leg portions (FIG. 3).

Another feature of the present invention resides in the fact that the length of the leg portions 21 can be decreased compared to the length used heretofore without impairment of the holding ability of the ear structure or its compensating properties for temperature and/or pressure changes. This is true also if relatively thicker material is used for the clamping band to further increase the tightening forces which can be applied to the ear structure during contraction of the clamp.

Tests have indicated that the strength can be increased by about 50% with the use of a reinforced ear structure in accordance with the present invention as compared to an ear structure with the prior reinforcing groove, with all other conditions remaining the same.

While I have shown and described only one embodiment in accordance with the present invention, it is understood that the same is not limited thereto but is susceptible of numerous changes and modifications as known to those skilled in the art. As pointed out above, the ear structure in accordance with the present invention can be used with any clamp in which so-called "Oetiker" ears or other ear-like structures can be used. Consequently, I do not wish to be limited to the details shown and described herein but intend to cover all such changes and modifications as are encompassed by the scope of the appended claims.

I claim:

1. A clamp structure which comprises clamping band means and at least one ear means for tightening the clamping band means about an object to be fastened, the ear means including two leg portions generally extending outwardly from the band means interconnected by a bridging portion which is provided with reinforcing means, characterized in that the reinforcing means is formed by depression means of generally pan-shaped, shallow configuration surrounded on all sides by remaining non-depressed parts of the bridging portion, said depression means including bottom means and longitudinally extending and transversely extending connecting portions delimiting the depression means along its longitudinal and transverse sides and connecting the bottom means along its longitudinal and transverse sides with the remaining non-depressed parts of the bridging portion, and the length and width of the connecting portions extending over such portions of the length and width of the bridging portion that the area of said depression means is, at least, about 35% of the total area of the non-reinforced bridging portion, which is defined substantially by the sum of the areas of the depression means and of the remaining non-depressed bridging parts, and wherein the longitudinally extending connecting portions subtend an angle within the range of about 70° to about 90° with respect to the bottom means and the remaining non-depressed parts of the bridging portion.

2. A clamp structure according to claim 1, wherein the transversely extending connecting portions subtend an angle within the range of about 70° to about 90° with respect to the bottom means and the remaining non-depressed parts of the bridging portion.

3. A clamp structure according to claim 1, wherein said connecting portions pass over into the remaining non-recessed parts of the bridging portion by way of rounded-off corners.

4. A clamp structure according to claim 3, wherein said rounded-off corners have small radii of curvature.

5. A clamp structure according to claim 1, wherein the area of the bottom means is about 35% to about 60% of the total area of the non-reinforced bridging portion which is defined substantially by the sum of the areas of the depression means and of the remaining non-depressed bridging parts.

6. A clamp structure according to claim 5, wherein the area of the bottom means is approximately half the total area of the non-reinforced bridging portion which is defined substantially by the sum of the areas of the depression means and of the remaining non-depressed bridging parts.

7. A clamp structure which comprises clamping band means and at least one ear means for tightening the clamping band means about an object to be fastened, the ear means including two leg portions generally extending outwardly from the band means interconnected by a bridging portion which is provided with reinforcing means, characterized in that the reinforcing means is formed by depression means of generally pan-shaped, shallow configuration surrounded on all sides by remaining non-depressed parts of the bridging portion, said depression means including bottom means and longitudinally extending and transversely extending connecting portions delimiting the depression means along its longitudinal and transverse sides and connecting the bottom means along its longitudinal and transverse sides with the remaining non-depressed parts of the bridging portion, and the length and width of the connecting portions extending over such portions of the length and width of the bridging portion that the area of said depression means is, at least, about 35% of the total area of the non-reinforced bridging portion, which is defined substantially by the sum of the areas of the depression means and of the remaining non-depressed bridging parts, and wherein said bottom means is, at least, substantially flat in the transverse direction of the clamping band means.

8. A clamp structure according to claim 7, wherein said bottom means is, at least, substantially flat in the longitudinal direction of the clamping band means.

9. A clamp structure according to claim 7, wherein said bottom means is concavely curved in the longitudinal direction of the clamping band means.

10. A clamp structure which comprises clamping band means and at least one ear means for tightening the clamping band means about an object to be fastened, the ear means including two leg portions generally extending outwardly from the band means interconnected by a bridging portion which is provided with reinforcing means, characterized in that the reinforcing means is formed by depression means of generally pan-shaped, shallow configuration surrounded on all sides by remaining non-depressed parts of the bridging portion, said depression means including bottom means and longitudinally extending and transversely extending connecting portions delimiting the depression means along its longitudinal and transverse sides and connecting the bottom means along its longitudinal and transverse sides with the remaining non-depressed parts of the bridging portion, and the length and width of the connecting portions extending over such portions of the length and width of the bridging portion that the area of said depression means is, at least, about 35% of the total area of the non-reinforced bridging portion, which is defined substantially by the sum of the areas of the depression means and of the remaining non-depressed bridging parts, and wherein said bottom means is, at least, of substantially rectangular shape.

11. A clamp structure which comprises clamping band means and at least one ear means for tightening the clamping band means about an object to be fastened, the ear means including two leg portions generally extending outwardly from the band means interconnected by a bridging portion which is provided with reinforcing means, characterized in that the reinforcing means is formed by depression means of generally pan-shaped, shallow configuration surrounded on all sides by remaining non-depressed parts of the bridging portion, said depression means including bottom means and longitudinally extending and transversely extending connecting portions delimiting the depression means along its longitudinal and transverse sides and connecting the bottom means along its longitudinal and transverse sides with the remaining non-depressed parts of the bridging portion, and the length and width of the connecting portions extending over such portions of the length and width of the bridging portion that the area of said depression means is, at least, about 35% of the total area of the non-reinforced bridging portion, which is defined substantially by the sum of the areas of the depression means and of the remaining non-depressed bridging parts, and wherein said bottom means is, at least, nearly flat in one of its longitudinal and transverse directions.

12. A clamp structure according to claim 11, wherein said bridging portion and said bottom means are of generally rectangular shape, as viewed in plan view, and wherein mutually opposite sides of the bottom means are substantially parallel to one another.

13. A clamp structure according to claim 11, wherein the said bottom means is of substantially rectangular shape.

14. A clamp structure according to claim 13, wherein at least some of the sides of the bottom means are substantially parallel to the corresponding sides of the bridging portion.

15. A clamp structure according to claim 14, wherein the area of the bottom means is about 35% to about 60% of the total area of the non-reinforced bridging portion.

16. A clamp structure which comprises clamping band means and at least one ear means for tightening the clamping band means about an object to be fastened, the ear means including two leg portions generally extending outwardly from the band means interconnected by a bridging portion which is provided with reinforcing means, characterized in that the reinforcing means is formed by depression means of generally pan-shaped, shallow configuration surrounded on all sides by remaining non-depressed parts of the bridging portion, said depression means including bottom means and longitudinally extending and transversely extending connecting portions delimiting the depression means along its longitudinal and transverse sides and connecting the bottom means along its longitudinal and transverse sides with the remaining non-depressed parts of the bridging portion, and the length and width of the connecting portions extending over such portions of the length and width of the bridging portion that the area of said depression means is, at least, about 35% of the total area of the non-reinforced bridging portion, which is defined substantially by the sum of the areas of the depression means and of the remaining non-depressed bridging parts, and wherein the sides of the bridging portion extending in the circumferential direction and curved concavely so that the width of the bridging portion in the areas near the leg portions is greater than in the area intermediate the leg portions.

17. A clamp structure which comprises clamping band means and at least one ear means for tightening the clamping band means about an object to be fastened, the ear means including two leg portions generally extending outwardly from the band means which are interconnected by a bridging portion, said bridging portion being provided with reinforcing means, the reinforcing means being in the form of shallow depression means extending in the circumferential direction and being surrounded on all sides thereof by remaining non-depressed parts of the bridging portion, the sum of the areas of the reinforcing means and of the remaining non-depressed parts substantially defining the total area of said bridging portion in its non-reinforced condition, and the area of said depression means occupying, at least, about 35% of the total area of said bridging portion in its non-reinforced condition, and wherein each depression means is of substantially rectangular shape and includes bottom means and connecting portions connecting the bottom means on all sides thereof with the remaining, non-depressed parts of the bridging portion, and wherein the connecting portions subtend an angle within the range of about 70° to about 90° with respect to the bottom portion and the remaining, non-depressed bridging parts.

18. A clamp structure according to claim 17, wherein the connecting portions pass over into the bottom means and the remaining non-depressed parts of the bridging portion by way of rounded-off corners with small radii of curvature.

19. A clamp structure according to claim 17, wherein the area of said depression means is about 40% to about 60% of the total area of the bridging portion.

20. A clamp structure according to claim 17, wherein the sides of the bridging portion extending in the circumferential direction are slightly curved concavely so that the width of the bridging portion in the areas near the leg portions is slightly greater than in the area intermediate the leg portions.

21. A clamp structure which comprises clamping band means and at least one ear means for tightening the clamping band means about an object to be fastened, the ear means including two leg portions generally extending outwardly from the band means which are interconnected by a bridging portion, said bridging portion being provided with reinforcing means, the reinforcing means being in the form of shallow depression means extending in the circumferential direction and being surrounded on all sides thereof by remaining non-depressed parts of the bridging portion, the sum of the areas of the reinforcing means and of the remaining non-depressed parts substantially defining the total area of said bridging portion in its non-reinforced condition, and the area of said depression means occupying, at least, about 35% of the total area of said bridging portion in its non-reinforced condition, and wherein the leg portions have a length of about 5 mm. with the bottom means recessed from the remaining non-depressed parts of the bridging portion by a distance less than the length of the leg portions.

22. A clamp structure according to claim 21, wherein said distance approaches the length of the leg portions.

23. A reinforced ear structure for use in a clamp whose clamping band is intended to be contracted by relatively large tightening forces, comprising two outwardly extending leg portions and a longitudinally extending reinforced bridging portion interconnecting said leg portions, characterized by shallow depression means constituting reinforcing means operable to increase the holding ability of the ear structure, the depression means being surrounded on all sides by remaining non-depressed parts of the bridging portion and including recessed bottom means recessed relative to said remaining non-depressed parts of the bridging portion and connecting portions between the bottom means and the remaining, non-depressed parts of the bridging portion, and the connecting portions which extend in the longitudinal direction, extending, at least, substantially parallel to one another, and wherein the depression means is, at least, nearly of rectangular shape with the sides thereof extending in the transverse direction being substantially parallel.

24. A reinforced ear structure according to claim 23, wherein the area occupied by said depression means is about 35% to about 60% of the total area of the bridging portion in its non-reinforced condition which is defined substantially by the sum of the area of the depression means and the area of the non-depressed remaining parts.

25. A reinforced ear structure according to claim 24, wherein the leg portions are of a length of about 5 mm., and wherein the bottom means is recessed from the remaining non-depressed parts of the bridging portion by a distance less than the length of the leg portions.

26. A reinforced ear structure according to claim 23, wherein the connecting portions which extend in the transverse direction, also extend, at least, substantially parallel to one another.

27. A reinforced ear structure according to claim 23, wherein the connecting portions subtend an angle with respect to the bottom means and the remaining, non-depressed parts of the bridging portion which is within the range of about 70° to about 90°.

28. A reinforced ear structure according to claim 27, wherein said connecting portions pass over into the remaining non-depressed parts of the bridging portion by way of rounded-off corners with small radii of curvature.

29. A clamp structure according to claim 23, wherein said bridging portion and said bottom means are of substantially rectangular shape, as viewed in plan view, and wherein mutually opposite sides of the bottom means are, at least, nearly parallel to one another.

30. A reinforced ear structure according to claim 23, wherein said bottom means is substantially flat in the transverse direction of the bridging portion.

31. A reinforced ear structure according to claim 23, wherein said bottom means is substantially flat in the longitudinal direction.

32. A reinforced ear structure according to claim 23, wherein said bottom means is concavely curved in the longitudinal direction.

33. A reinforced ear structure according to claim 23, wherein the sides of the bridging portion extending in the longitudinal direction are curved concavely so that the width of the bridging portion in the areas near the leg portions is slightly greater than in the area intermediate the leg portions.

34. A reinforced ear structure according to claim 33, wherein the area of the bottom means is about 35% to about 60% of the total area of the bridging portion in its non-reinforced condition which is defined substantially by the sum of the area of the depression means and of the area of the remaining non-depressed parts.

35. A reinforced ear structure according to claim 23, wherein said bottom means is concavely curved in the longitudinal direction.

* * * * *